May 25, 1965 H. C. COLLINS 3,185,931

DIFFERENTIALLY COHERENT BIPHASE DEMODULATOR

Filed Oct. 22, 1962 3 Sheets-Sheet 1

"Normally Open" AND Gate

INVENTOR:
Harry C. Collins
By Seymour Schalnick
Attorney

DIFFERENTIALLY COHERENT BIPHASE DEMODULATOR

Filed Oct. 22, 1962 3 Sheets-Sheet 2

INVENTOR.
Harry C. Collins
By Seymour Schelnick
Attorney

DIFFERENTIALLY COHERENT BIPHASE DEMODULATOR

Filed Oct. 22, 1962 3 Sheets-Sheet 3

INVENTOR.
Harry C. Collins
By Seymour Acholnick
Attorney

United States Patent Office 3,185,931
Patented May 25, 1965

3,185,931

DIFFERENTIALLY COHERENT BIPHASE DEMODULATOR

Harry C. Collins, Canoga Park, Calif., assignor to Litton Systems, Inc., Beverly Hills, Calif.

Filed Oct. 22, 1962, Ser. No. 232,234
9 Claims. (Cl. 329—103)

The present invention relates to phase modulation digital data communications equipment and more particularly, to an improved differentially coherent biphase demodulating system which operates on an applied biphase modulated signal having timing and data information contained therein, to transform said biphase modulated signal into a train of regularly recurring timing signals and a series of data signals representing said timing and data information, respectively.

In recent developments in the field of high speed data communication, digital data techniques have been utilized in communication systems for realizing a high information-to-bandwidth ratio at low error rates over voice-bandwidth channels. However, one of the critical areas in any digital communication system is the communication link, and more particularly, the type of modulation used in the associated data terminals. Serious consideration must be given to any modulation technique employed within a data terminal that is characterized by a high information-to-bandwidth ratio at a low error rate.

Phase modulation or phase shift keying is such a modulation technique, but its application has been limited by the complexity of its implementation. Since this implementation complexity generally implies large size and high cost, phase shift keying techniques for data modulation have not been seriously considered in applications that require simplicity, light weight, and reliability.

In contrast, however, digital communication systems have been demonstrated utilizing two phase or biphase modulation techniques, attaining bit rates of 1200 bits per second over voice-bandwidth channels, which have greater theoretical simplicity and which require fewer components for the mechanization thereof. It appears that a twofold advantage accrues from the use of biphase modulation techniques for data modulation: first, that a lower signal-to-noise ratio in the applied biphase signal is acceptable by the receiving data terminal; and secondly, the equipment needed for producing and detecting the biphase signal is reduced in complexity.

One biphase system, which is called a coherent phase shift keyed system, requires a phase reference at the receiver in order to distinguish between two phases of the incoming signal, and thus is not easily mechanized. On the other hand, a differentially coherent phase shift keyed system, for which no absolute phase reference is assumed at the receiver, operates by detecting changes in phase of the incoming waveform allowing information to be conveyed by phase transitions.

In such differentially coherent data receiving systems employing biphase modulation techniques, the phase of one cycle of a biphase modulated signal is compared with the phase of the preceding cycle in order to detect a change in phase. In such a biphase modulated signal, a first datum value may be represented by a 180° phase reversal between successive cycles of the signal, and a second datum value may be represented by no phase reversal between successive cycles.

While many biphase demodulating devices are presently known for comparing phases of an incoming biphase modulated signal, these prior art devices have numerous limitations.

In one prior art method of accomplishing such a comparison, the incoming signal is delayed for a time corresponding to one cycle of the signal so that a direct comparison is possible between the phase of the signal at each cycle and the immediately succeeding cycle. An analog multiplication circuit, to which is applied the incoming biphase signal and the delayed signal, continuously multiplies these two applied signals to produce an output signal whose polarity can be directly sampled by a signal integrator to indicate the presence or absence of phase reversals.

Although this biphase demodulating system demonstrates one desirable characteristic, that of being relatively unaffected by instantaneous noise present on the incoming biphase signal, the signal delay and analog multiplication techniques are difficult to mechanize economically. Lumped constant and magnetostrictive delays, for the time intervals under consideration, are relatively large and expensive, while other techniques for obtaining the signal delay require comparatively complex circuitry. The analog multiplication circuitry associated with this system also necessitates rather complicated and inordinately sensitive circuitry.

In addition this prior art demodulating system utilizes the timing pulses, derived from the incoming biphase modulated signal, to indicate the times at which the polarity of the multiplied signal is to be sampled, as well as exiting the timing pulses as a necessary output of the system. Derivation of the timing signal employs some form of frequency doubler and crossover point detector circuit, where in said circuit those points where the received sinusoidally varying biphase signal crosses the zero reference axis are sensed and a regular pulse train generated, therefrom, corresponding to each such point. The implementation of such a scheme is cumbersome for several reasons, the most important of which is that the derived timing pulses must be very accurately related to the beginning or end of each signal bit interval, thereby making phase control of the tuned circuit timing generator a necessity. Accurate derivation of the timing signal together with total system complexity presents the most difficult problems in mechanizing this prior art biphase demodulator.

A second prior art differentially coherent biphase demodulating system utilizes a differentiating circuit to which the biphase modulated signal is applied for producing a pulse on every occasion where the biphase signal changes polarity. From this series of pulses the timing and data information contained in the biphase modulated signal can be obtained. While this demodulating system offers a solution to the circuit complexity problem, the required differentiating circuit introduces the more serious problem of being extremely susceptible to random noise disturbances on the incoming signal. Moreover, both the timing signal generator and the data detector are directly dependent upon the detection of instantaneous values of the incoming biphase signal by the differentiator. Thus, either the timing generator or data detector, or both, could be falsely triggered by a noise signal, introducing serious error to the demodulating system output signal.

In accordance with the present invention a simply mechanized, differentially coherent biphase demodulating system is provided which displays the desired characteristics of detecting, from a 180° phase modulated signal, the timing signal and datum signal contained therein with high accuracy and great insensitivity to input noise signals. Within the system, the data detector of the present invention utilizes an integrating circuit responsive to an applied biphase modulated signal and operative on said signal for producing an integrated biphase modulated signal from which datum signals are derived. The present invention further includes a unique, simply mechanized means for sampling the integrated biphase modulated signal on command from a timing pulse generator, and delivering the resultant thereof as the data output signal. The unique cooperative action between the data detector and the timing pulse generator, of the present demodulating system, is such as to greatly reduce the possibility of introducing random noise error in the data output signal. The timing signal generator cannot be falsely triggered by an incoming random noise signal except during the last one-fourth of each bit interval, and moreover even if the timing signal generator is falsely triggered at a particular bit interval, the data detector, which responds to the total energy of the lapsed time interval and does not respond to instantaneous signal changes, delivers no falsely created output pulse to the data output signal. Accordingly, a precise bit rate of the incoming signal is not required and a reduction of the frequency control requirement on the input biphase signal is achieved. Furthermore, the unique structure and operation of the present differentially coherent system of biphase detection, allows phase comparison and bit integration to be accomplished as one function requiring no multiplication for comparison.

The invention as described in the specification, is in no way limited by the particular choice of transmitting equipment. Although, the specification describes one particular apparatus for producing the biphase modulated signal, in the communication art a number of suitably efficient means have been developed for producing the same biphase signal. Since these transmitting systems have been fully described in current technical proceedings, it is not deemed necessary to provide a detailed description herein.

It is therefore an object of the present invention to provide a biphase demodulating system which is not affected by random noise perturbations that are present on an applied biphase modulated signal.

It is another object of the present invention to provide a differentially coherent biphase demodulating system that is inherently more reliable and simpler in construction.

It is still another object of the present invention to provide a biphase demodulator wherein an applied biphase modulated signal is integrated over a time period determined by a timing signal generator to detect the changes of phase in the applied biphase signal, each change of phase representing a corresponding datum value.

It is a further object of the present invention to provide a simple and more reliable biphase demodulating system, wherein a 180° phase modulated signal is separated into a train of regularly recurring timing pulses and a train of data pulses corresponding to the timing and data information contained, respectively, in the biphase modulated signal.

It is yet another object of the present invention to provide a biphase demodulating system that can detect the correct information from an applied biphase modulated signal that is disturbed by high random noise levels.

It is still another object of the present invention to provide a differentially coherent biphase detection scheme responsive to a biphase modulated signal that allows phase comparison and bit integration to be accomplished as one function.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, that the drawings are for the purpose of illustration and description only and are not intended as a definition of the limits of the invention.

In the drawings:

FIGURE 1 is a partly block, partly circuit diagram of a biphase demodulator, according to the present invention;

FIGURE 2 comprises wave form charts wherein are displayed, on a common time scale, the waveforms of various signals, A through H, respectively, as they would appear during the operation of the demodulating system illustrated in FIGURE 1;

Figure 1:
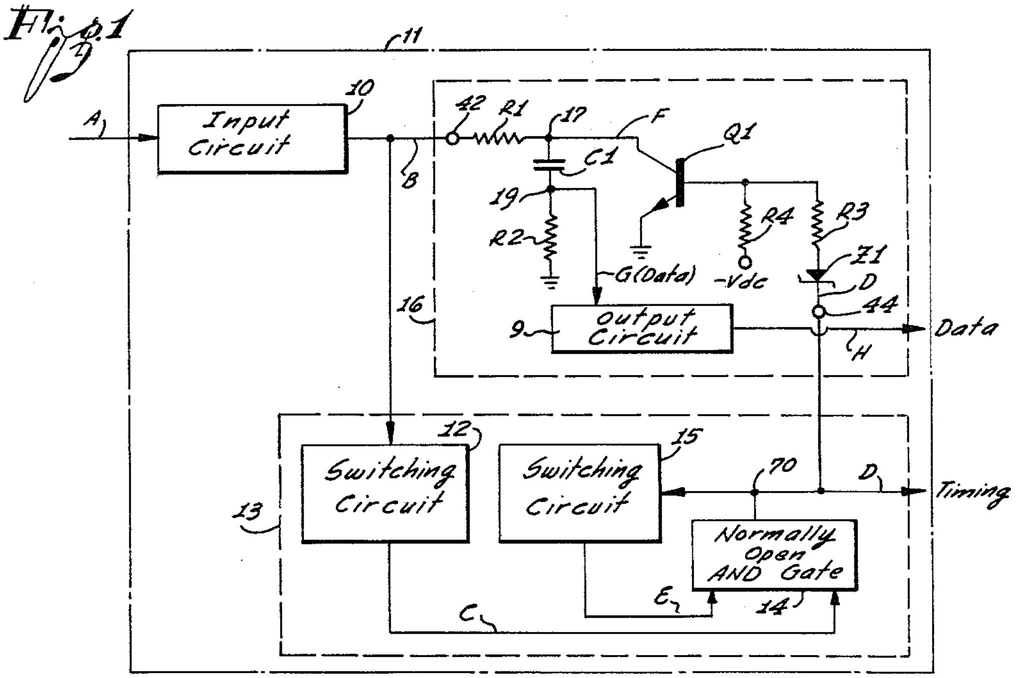
Figure 2:
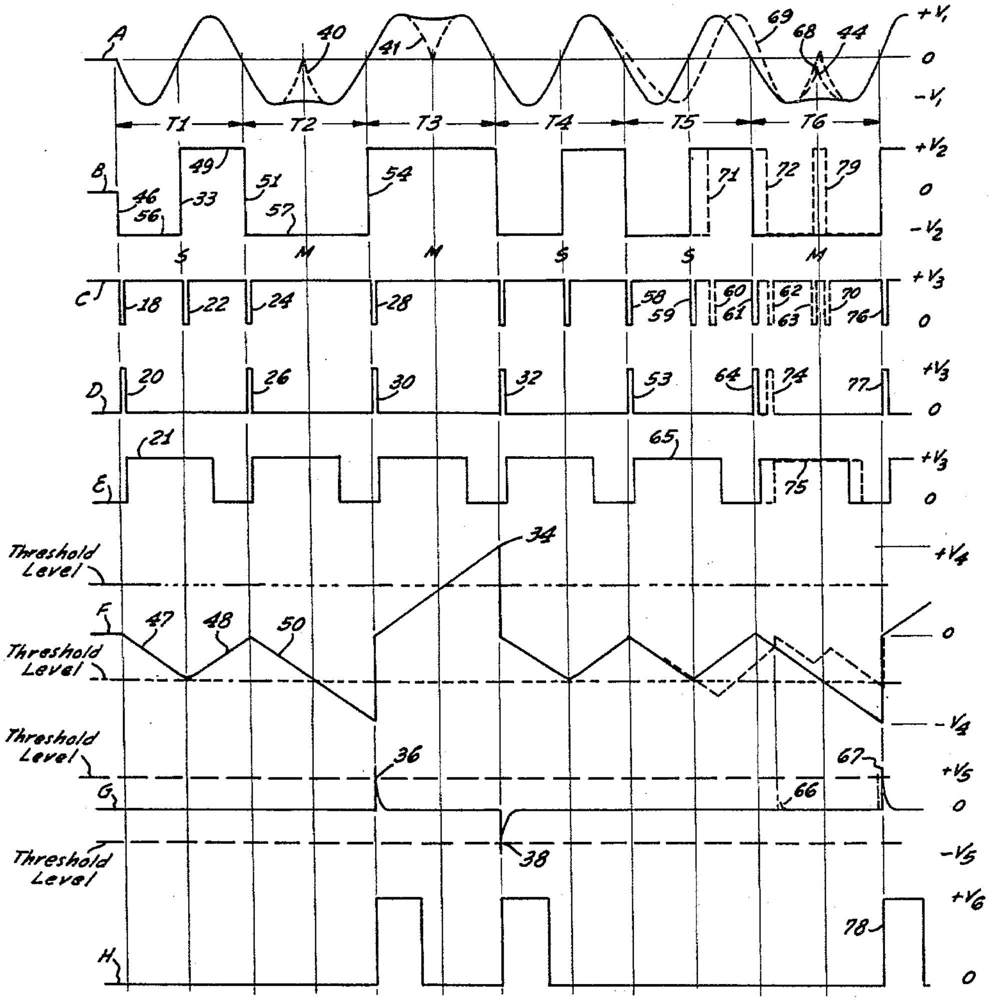

Referring now to the drawings, wherein the waveforms of FIGURE 2 will be considered in conjunction with the description of FIGURE 1, there is shown in FIGURE 1, a partly block, partly circuit diagram of a biphase demodulator 11, according to the present invention, responsive to a biphase modulated input signal, as for example signal A illustrated in FIGURE 2, composed of merged data and timing information, for producing an output train, designated D, of regularly recurring timing signals and a train H of datum signals in accordance with the timing and data information contained in said input biphase modulated signal, respectively.

As shown in FIGURE 1, demodulator 11 comprises an input circuit 10, a timing signal generator 13, and a data detector 16. In accordance with the invention, input circuit 10 (which may comprise a conventional amplifying and squaring circuit), receives a sinusoidally varying biphase modulated signal, which may have the form of waveform A illustrated in FIGURE 2, and operates on said sinusoidally varying biphase signal to produce a corresponding square-wave output signal B. As shown in the drawings, square-wave signal B, emanating from input circuit 10, has the same phase reversal characteristics as input biphase modulated signal A; however, this square-wave signal may now be successfully applied to switching circuitry. It should be herein noted, that for the case where the input biphase signal is of square-wave form, input circuit 10 may be eliminated from the demodulating system.

Accordingly, square-wave biphase modulated signal B, wherein the modulation is such that said signal will cross the zero axis at least once during every bit interval, is applied to a switching circuit 12 in timing signal generator 13. Said switching circuit 12 generates a train of narrow negative-going pulses C corresponding to all zero axis cross-over points which occur when input biphase modulated square-wave B changes polarity. As shown in FIGURE 1, the remainder of the timing signal generator circuitry acts to remove those negative-going pulses of pulse train C which occur at the one-half bit time interval. For this purpose, pulse train C is applied to a "normally open" AND gate 14, said AND gate being in such condition so as to pass a first pulse of pulse train C to a delay switching circuit monostable multivibrator 15, activating said switching circuit for a time period equal to three-fourths of a bit interval. An output signal E of switching circuit 15 is applied to "normally open" AND gate 14 together with the train of pulses C from switching circuit 12, said AND gate producing an output signal D only when both the voltage levels of its respective inputs, E and C, are coincident. In this manner, regularly recurring timing pulses D are effectively derived from the incoming biphase modulated signal.

Square-wave biphase modulated signal B is also applied to data detector 16 for deriving from said signal the information contained therein. Biphase signal B is applied to said data detector at a terminal 42 from which said signal passes through a first resistor R1 in series with a first capacitor C1 and a second resistor R2 to ground. Within data detector 16, a collector terminal of a transistor Q1 is connected to a common terminal 17 between said first resistor R1 and said first capacitor C1. Initially, transistor Q1 is in a condition of cut-off, providing an open circuit from terminal 17 to any ground potential point. It should here be noted, that second resistor R2 has a value much less than the value of first resistor R1. Accordingly, the combination of R1 and C1 comprise a normal signal integrating circuit responsive to square-wave biphase modulated signal B for producing at terminal 17 a resultant integrated biphase signal as shown in waveform F of FIGURE 2.

Data detector 16 is also responsive to timing signals D as generated by timing signal generator 13. Timing signal D is applied to data detector 16 at a terminal 44 from which said timing signal passes through a zener diode Z1 in series with a third resistor R3 to a base terminal of transistor Q1. Said base terminal is also biased at a negative D.C. potential (designated V*dc*) through a fourth resistor R4, while an emitter terminal of transistor Q1 is connected directly to ground.

Upon receipt of a timing signal, transistor Q1 is driven into a condition of saturation thereby placing terminal 17 at ground potential. When terminal 17 is driven to ground potential the combination of resistor R2 and capacitor C1 operates as a differentiating circuit for differentiating the signal appearing at terminal 17 to produce a corresponding positive and negative spike pulse signal from train G, as shown in the waveform of signal G in FIGURE 2, which exits the differentiating circuit at a terminal 19. The spike pulses of signal G are applied to an output circuit 9 which is operative for converting said signal (provided the spike pulses are above a predetermined amplitude) into a corresponding train of positive-going data signals, as shown in waveform H of FIGURE 2. The reason for having said output circuit 9 insensitive to signals below a predetermined amplitude will be discussed at a later point in the present specification.

The operation of the present demodulator may best be understood by considering the interactions of the combination of the hereinabove described data detector 16 and timing signal generator 13 to which are simultaneously applied square-wave biphase modulated signal B, wherein said biphase modulated signal the first time interval is a datum "space" and the second time interval is a datum "mark."

As pointed out above, switching circuit 12 is responsive to square-wave biphase modulated signal B for producing a chain of negative-going pulses, each of said pulses occurring at a time when biphase modulated signal B changes polarity. For example, negative-going pulse 18 of pulse 18 of pulse train C is produced when switching circuit 12 is triggered by a negative-going leading edge 46 of negative pulse 56 of square-wave biphase modulated signal B. Similarly, negative-going pulse 22 of pulse train C is produced when switching circuit 12 is triggered by a positive-going leading edge 33 of a positive pulse 49 occurring in square-wave biphase modulated signal B. The output pulse train C of switching circuit 12 is applied to "normally open" AND gate 14, and as was hereinabove stated, AND gate 14 is in such a condition so as to pass said first pulse 18 of pulse train C through AND gate 14, said first pulse 18 triggering delay switching circuit 15. The activated delay switching circuit 15 functions to produce a square pulse 21, as shown in waveform E of FIGURE 2, over a time period equal to three-fourths of a bit interval. The output signal E of switching circuit 15 is applied to "normally open" AND gate 14 together with the train of pulses C from switching circuit 12. As was also hereinabove noted, an output pulse on pulse train D occurs only when the voltage levels of the respective inputs, E and C are equal. The application of pulse train E to AND gate 14 essentially closes said AND gate for three-fourths of a bit interval and prevents the appearance of pulses occurring during that period of time. For example, pulse 22 is excluded during the first time interval since it occurs at the half bit time, whereas pulses 18 and 24 of pulse train C occur at times when the voltage level of waveform E is zero and thus pulses 20 and 26 of pulse train D result therefrom. Accordingly, a regularly recurring chain of pulses D is produced as the output of timing signal generator 13.

As shown in FIGURE 1, square-wave biphase modulated signal B is also applied to the data detector at terminal 42 while simultaneously the data detector is responsive to the chain of timing pulses D applied at terminal 44. Their interaction on the data detector may best be understood by noting that the positive-going pulse 20 of the pulse train D initiates time period T1, while simultaneously leading edge 46 of square-wave 56 is presented to the integrating combination R1 and C1. The presence of a negative pulse 56 of signal B over one-half of the time period T1 across the terminals of capacitor C1 results in a negative charge being present at the end of this half-time period on capacitor C1. However, after one-half period T1, square-wave signal B changes to a positive sense for the same length of time, resulting in a zero net charge after the full period, said period T1 being terminated by the presence of a second positive timing pulse 26. The application of timing pulse 26 to the base terminal of transistor Q1 drives the transistor into a condition of saturation and opens up a ground path for terminal 17 through said transistor Q1. However, there being no charge at the end of this first time interval on capacitor C1 between terminals 17 and 19, there exists no potential change at terminal 19 when this ground path is initiated and therefore no output pulse is produced in the data signal G.

Two possible conclusions follow from the absence of an output pulse at the end of a particular time interval in data signal G: either, that no signal was applied during that particular time interval; or, that if a signal was applied, no phase reversal occurred in the signal during that particular time interval. Since the presence of timing signals 20 and 26 demonstrate that a signal was applied during the first time interval, it follows that the absence of an output pulse at the end of this interval indicates that a phase reversal did not occur, the lack of phase reversal, in turn, being the manifestation of a dataum "space" recorded in said first time interval.

Besides terminating the first time period, a second time interval T2 is initiated by positive-going pulse 26 of pulse train D, as shown in FIGURE 2, while simultaneously leading edge 51 of a negative square-wave 57, of biphase modulated signal B, is applied to terminal 42 of data detector 16. As before, over the first half of time interval T2 a negative charge is established on capacitor C1. However, because a phase reversal occurred in the second time interval, during the last half of this second time interval, square-wave 57 remains in the negative state and increases the magnitude of negative charge on capacitor C1 until the occurrence of a third timing pulse 30, at which time, transistor Q1 is again driven into saturation and effectively places terminal 17 at ground potential. With terminal 17 at ground potential, the magnitude of charge on capacitor C1 is sampled and released, by the differentiating combination of capacitor C1 and resistor R2, as a spike pulse 36 of data signal G. Only for the brief interval of time, determined by the pulsewidth of timing pulse 30, does transistor Q1 remain in its saturated state. The dumping of charge contained in capacitor C1, while producing an output pulse 36 of signal G signifying a datum "mark," leaves zero potential difference between terminals 17 and 19 on the respective ends of capacitor C1. Furthermore, timing pulse 30, besides terminating the second time interval, initiates a third time interval T3, during which similar action of the interrelated circuits produces a magnitude of charge at the end of said time interval of a positive sense, said charge magnitude being represented by point 34 on waveform F. In the same manner, as was hereinabove noted, data detector 16 produces a negative spike output pulse 38 at the end of time period T3, as designated by a timing pulse 32 in waveform D of FIGURE 2. Accordingly, for each occasion where there occurs a 180° phase reversal between two successive cycles in the applied biphase modulated signal, representing a datum "mark" in said input signal, a positive or negative spike pulse will be emitted from the demodulator to pulse signal train G, resulting in output pulses 80 and 82 in signal H corresponding to pulses 36 and 38 respectively of signal G. Further, a datum pulse, as will be clarified below, is one which exceeds a predetermined threshold amplitude of said output signal G.

As was described hereinabove, the present differentially coherent biphase demodulating system substantially eliminates the possibility of normal random noise producing error in the data output signal. To facilitate the description of this desirable characteristic of the present demodulator, applied biphase modulated signal A has been distorted by the presence of random noise signals during the fifth and sixth time intervals. The distorted biphase modulated signal A, as shown during the fifth and sixth time intervals in dotted line form, subsequently produces perturbations 71, 72 and 79 in the square-wave biphase modulated signal B. In the manner described above, square-wave biphase modulated signal B is applied to switching circuit 12 of timing signal generator 13, said switching circuit being again responsive to the square-wave biphase modulated signal for producing, during the fifth time interval, narrow negative-going pulses 58, 60 and 62. Said fifth time interval is initiated by the presence of pulse 58 and is terminated by pulse 62, said pulse 60 being considered to be undesirable. As hereinbefore stated, pulse train C is applied to "normally open" AND gate 14, and AND gate being in such a condition so as to pass first time pulse 58 of the fifth time period. Said first time pulse 58 activates delay switching circuit 15, said switching circuit producing an output pulse 65, of waveform E, which last for three-fourths of the predetermined time interval and which is applied to "normally open" AND gate 14. The simultaneous application of pulse 65, of waveform E, and pulse 60, of waveform C, to the "normally open" AND gate result in a zero output signal on waveform D, since the voltage levels of the respective inputs, E and C, are not equal. It is also apparent from a careful examination of waveform C, that the fifth time interval is not terminated after the same length of time as were the previous time intervals, but is terminated by a late timing pulse 62, of waveform C, said pulse 62 passing through "normally open" AND gate 14 and triggering switching circuit 15. Nevertheless, as previously described, said switching circuit produces an output pulse 75 which lasts for three-fourths of the predetermined time interval. Again, the simultaneous application of pulse 75, of waveform E, and pulses 63 and 70 of waveform C, to "normally open" AND gate 14 result in a zero output signal on waveform D. After three-fourths of the predetermined time interval, output signal E of switching circuit 15 returns to zero potential and the simultaneous application of this signal together with pulse 76, of waveform C, to "normally open" AND gate 14, places said AND gate in such a condition so as to produce a pulse 77 on the train of regularly recurring timing pulses D.

Accordingly, the train of regularly recurring timing pulses D is presented to data detector 16 at terminal 44. As was hereinbefore stated, the fifth time interval is initiated in the data detector by pulse 53 of said timing signal, while simultaneously square-wave, biphase modulated signal B is presented to terminal 42 of the data detector. As will be noted in the integrated biphase modulated signal F, the period of integration has been lengthened during the fifth time interval and shortened during the sixth time interval by the occurrence of late timing signal 74. At the end of the fifth time interval, therefore, there exists a small quantity of charge in capacitor C1 of the integrating circuit that is released by the data detector in the manner hereinbefore described in response to timing pulse 74. However, the dumping action of the data detector in response to timing pulse 74, thereby releasing the charge contained in capacitor C1, does not produce an output pulse on data waveform G of sufficient amplitude to trigged output circuit 9, but rather produces a low-level pulse 66 which is disregarded by said output circuit.

Considering now the integration process performed on the squarewave biphase modulated signal B during the sixth time interval, said sixth time interval initiated by pulse 74 of waveform D and terminated by pulse 77 of waveform D, it will be apparent that, while there has occurred during said sixth time interval a positive-going pulse 79, in square-wave biphase modulated signal B, the integrating circuit of data detector 16 tends to minimize the effects of this positive-going excursion. In this regard, as shown in waveform F of FIGURE 2, the quantity of charge stored within capacitor C1 after the sixth time interval, said charge quantity being represented by the amplitude of integrated biphase modulated signal F, is of sufficient magnitude to produce a datum pulse 67 on data waveform G greater than a predetermined threshold level, said datum pulse 67 triggering output circuit 9 which emits output pulse 78 to output waveform H.

Therefore, while in the prior art systems of biphase demodulation distorted waveform 69 of applied biphase modulated signal A and the positive excursion 68 of the same waveform would introduce serious error in the timing and data output signals, in the present system of biphase demodulation the effect of these noise disturbances has been substantially minimized by including, in the present system, a biphase signal integrating circuit interrelated with a means to apply the derived timing signal to this integrating circuit for defining the periods of integration. Accordingly, data detector 16, which is responsive to the total energy of a lapsed time interval, is only minutely responsive to the instantaneous signal fluctuations and variations produced by random noise signals that occur during the respective time intervals. The present system is capable of deriving, from an applied biphase modulated signal that is disturbed by spurious noise signals, the correct timing and data information contained therein.

It should be here noted, that while the embodiment of the invention as shown in FIGURE 1 includes an output circuit 9, no output circuit need be provided when the hereindescribed invention is used in conjunction with common utilization devices. In most cases, these utilization devices will be equipped with an input circuit in which the triggering or threshold level may be adjusted, thus eliminating the necessity of having amplitude discrimination solely accomplished by the demodulator.

Attention is directed again to FIGURE 2, wherein will be noted, in waveform A, said waveform representing the received sinusoidally varying biphase modulated signal, that where the aforementioned phase reversals occur sharp cusps 40, 42 and 44 are not received by the data terminal because of the smoothing and filtering arising in the transmitting and receiving equipment with regard to the transmittal and receipt of high frequency. These sharp cusps 40, 42 and 44 are illustrated in dotted line form on waveform A for clarification of exactly how the phase reversals occur. The remaining waveforms B, C, D, E, and F and G have been discussed hereinabove in conjunction with the operation of the embodiment of the invention as shown in FIGURE 1.

Figure 3:
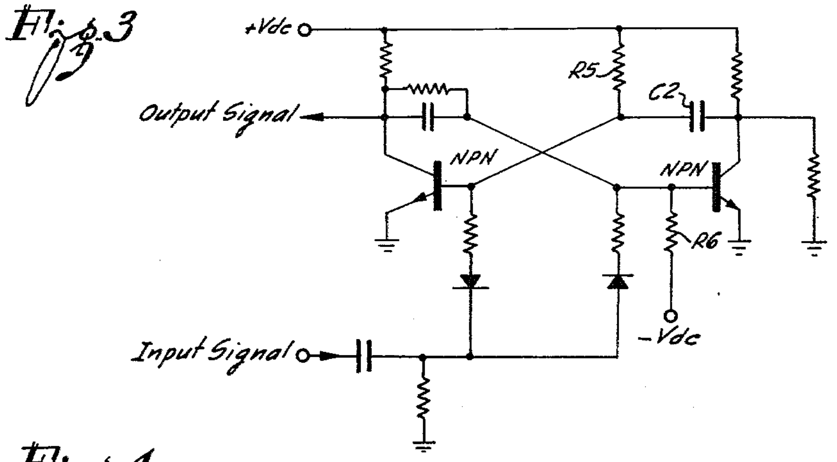
FIGURE 3 is a circuit diagram that illustrates, by way of example, one switching circuit known in the art, that could be employed in the demodulating system shown in FIGURE 1.

Referring now to FIGURE 3, there is shown one form of switching circuit which might be employed in timing signal generator 13. To one skilled in the art, this switching circuit is commonly known as a monostable multivibrator adapted for triggering on both negative and positive input signals, and is illustrated in the form of switching circuit 12 of timing signal generator 13. The theory and operation of this type switching circuit is fully described in many references of the prior art, such as may be found on page 599, and the pages following, of "Pulse and Digital Circuits" by Millman and Taub, published in 1956 by the McGraw-Hill Book Company, Inc., of New York, Toronto, and London. It is deemed unnecessary, therefore, to provide a further explanation herein. It is important to note, however, that the width of each pulse in the output signal, of the switching circuit described, is related to the R5–C2 time constant, and the triggering or threshold level for the input signal is controlled by the value of resistor R6.

Figure 4:
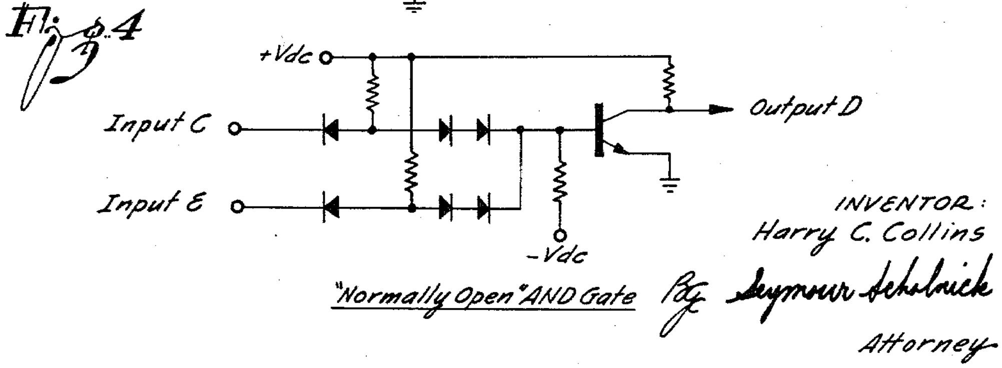
FIGURE 4 is a circuit diagram illustrating, by way of example, a type of "normally open" AND gate that could be employed in the demodulating system described in FIGURE 1.

One form of "normally open" AND gate circuit suitable for the embodiment of the invention as illustrated in FIGURE 1, is shown in FIGURE 4. Examination of the circuit reveals that, in the absence of coincident low level input signals, no output signal is emitted. Accordingly, when the respective inputs to said AND gate are at zero potential, over an identical period of time, an output pulse is emitted during said time period.

Figures 5, 6:
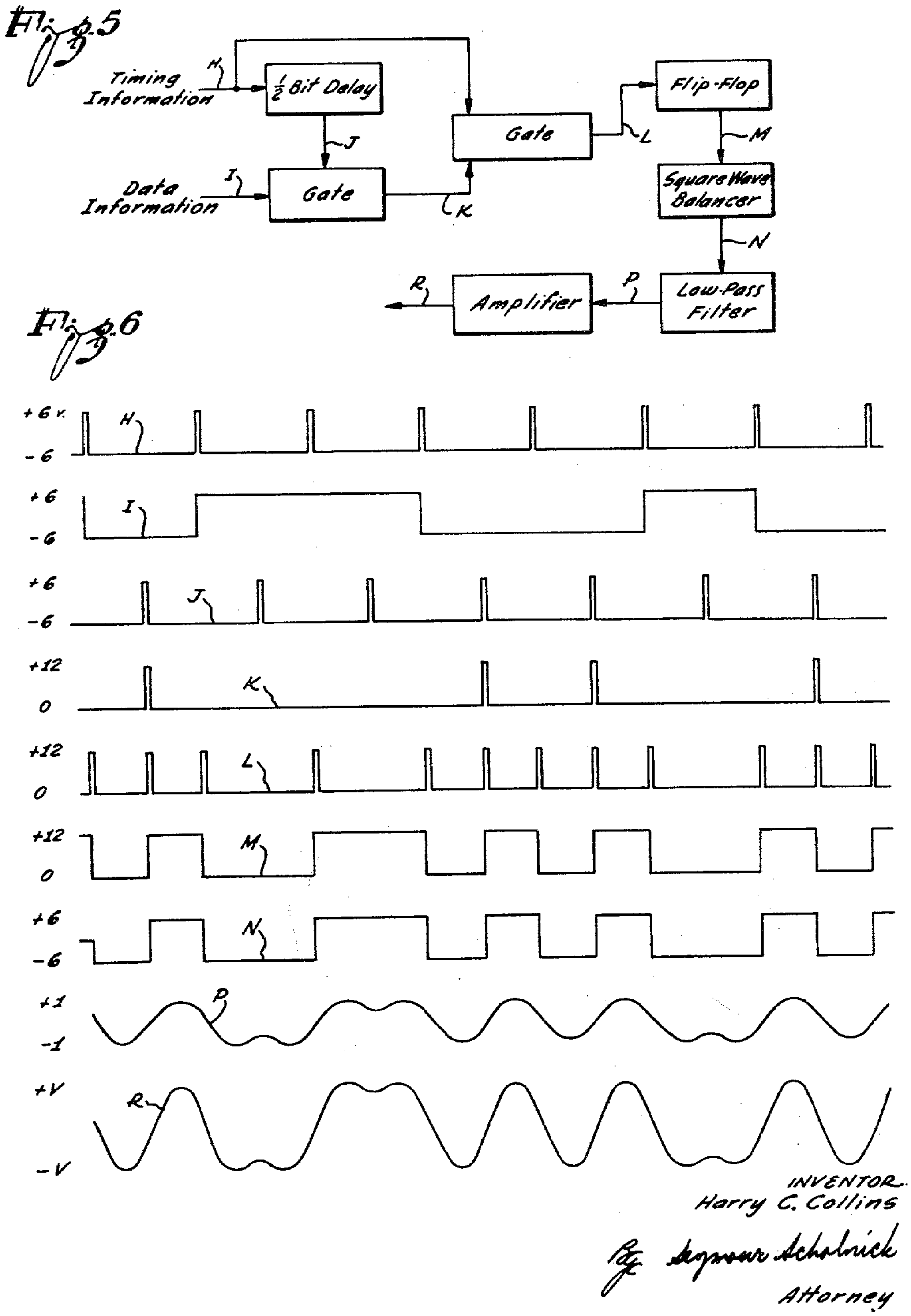
FIGURE 5 is a block diagram of one form of transmitting apparatus capable of producing a biphase modulated signal.
FIGURE 6 comprises waveform charts wherein are displayed, on a common time scale, the waveforms of various signals as they would appear during the operation of the transmitting apparatus illustrated in FIGURE 5.

One form of apparatus suitable for producing a 180° phase modulated signal, is shown in FIGURE 5. Typical signals occurring at various points within the transmitting apparatus, detailed in FIGURE 5, are illustrated on a common time scale in FIGURE 6. Since, to one skilled in the art, the operation of this apparatus is considered to be straightforward, a description will not be undertaken herein. Moreover, let it be emphasized that the differentially coherent biphase demodulating system of the present invention is in no way limited by the particular choice of transmitting equipment.

It will be recognized, by those skilled in the art, that other structures could be employed to mechanize the basic concept of the present invention. The particular hardware described in the present disclosure that is, of necessity, associated with the concept of the invention, in no way limits the number of available circuits in the art that can be applied. In this regard, it should be fully understood that the basic structure described hereinabove is responsive to an applied biphase modulated signal and operates on said biphase modulated signal, whatever the waveshape, for detecting a change in phase by integrating said biphase signal over a predetermined period of time, the resultant of this integrating process exited in some form of output signal.

It is clear, of course, that numerous modifications and alterations could be made in the differentially coherent biphase demodulator, herein described, without departing from the spirit of the invention. For example, while data detector 16 as illustrated in FIGURE 1, is composed of an integrating circuit, a switching circuit and a sampling circuit of relative simplicity, other circuits known in the art may be utilized. In this regard a relay may be substituted for transistor Q1 and an integrating amplifier for the R1–C1 integrating circuit without effect on the operation of the invention. Similarly, a delay multivibrator that integrates an applied biphase signal on the cross-coupling resistor-capacitor combination could also be employed as a data detector, the data dumping action being provided by triggering an alternate side of the multivibrator. Furthermore, any switching means could be substituted for transistor Q1 without disturing the operation of the data detector. From the above, it should also be noted that many types and combinations of logic circuits could be utilized in conjunction with the switching means of timing signal generator 13 for retrieving the timing information from the biphase modulated input signal without departing from the basic concept of the present invention. Accordingly, it is to be expressely understood that the invention is limited only by the spirit and scope of the appended claims.

What is claimed as new is:

1. A biphase demodulating apparatus for separating an applied differentially phase modulated input signal, having timing and data information contained therein, into a train of regularly recurring timing signals and a series of data signals, respectively representing said timing and data information, said apparatus comprising:
   - a timing signal generator responsive to the differentially phase modulated input signal for producing a timing signal of predetermined period T; and
   - a differentially coherent biphase detection means receiving the phase modulated signal and responsive to said timing signal for integrating said phase modulated signal over each time period T defined by the timing signal to selectively produce a data output signal in accordance with the information contained in said phase modulated signal.

2. A differentially coherent biphase demodulator responsive to a phase modulated signal representing both timing and data information for deriving from the phase modulated signal a plurality of regularly recurring timing pulses representing the timing information and a train of datum pulses representing the data information contained in the phase modulated signal, said demodulator comprising:
   - means for operating upon the applied phase modulated signal to produce regularly recurring timing pulses marking predetermined periods of the phase modulated signal, said regularly recurring timing pulses representing the timing information contained in the phase modulated signal; and
   - information detecting means responsive to the phase modulated signal and said timing pulses for integrating the phase and operating on the integrated phase modulated signal for selectively producing a datum signal whenever said integrated phase modulated signal exceeds predetermined amplitude at the time of application of said timing pulse.

3. A differentially coherent biphase demodulating system responsive to an applied phase modulated signal, said phase modulated signal being a composite of timing and data signals, for separating said phase modulated signal into a plurality of repetitive timing pulses and a chain of datum pulses in accordance with the timing and data information contained, respectively, therein, a first datum value of said phase modulated signal being represented by a phase change between successive cycles of said phase modulated signal, and a second datum value being represented by no phase change between successive cycles, said system comprising:
   - means responsive to the applied phase modulated signal for regenerating regularly recurring timing pulses which mark predetermined time intervals of said phase modulated signal;
   - information detecting means receiving said phase modulated signal and responsive to the application of each timing pulse for integrating said phase modulated signal over each time interval defined by said timing pulses and storing an integrated phase modulated signal therein; and
   - means responsive to said timing pulses for sampling said integrated phase modulated signal stored within said detecting means to selectively produce a datum signal whenever said integrated phase modulated signal exceeds a predetermined amplitude at a time defined by the application of said timing pulses to said detecting means.

4. A demodulating network for extracting data information from an applied phase modulated signal, said network comprising:

detection means for integrating the applied phase modulated signal over a predetermined time period to produce an integrated phase modulated signal, said detection means including means for storing said integrated phase modulated signal;

control means coupled to said detection means and responsive to an applied timing signal for initiating and terminating said predetermined time period of integration; and output means coupled to said means for storing said integrated phase modulated signal for selectively producing a datum pulse, representative of data information contained within the phase modulated signal, at the termination of each predetermined time period where the amplitude of said integrated phase modulated signal exceeds a selected amplitude.

5. A differentially coherent biphase demodulating system for separating from an applied phase modulated signal a regularly recurring train of timing pulses and a chain of datum pulses in accordance with timing and data information contained, respectively, in said phase modulated signal, a first datum value of said phase modulated signal being represented by a phase change between successive cycles of said phase modulated signal, and a second datum value being represented by no phase change between successive cycles, said demodulating system comprising:

means responsive to the applied phase modulated signal and operative on said phase modulated signal for regenerating a train of timing pulses to mark predetermined time intervals;

information detecting means receiving the applied phase modulated signal and responsive to said timing pulses for integrating the phase modulated signal over each of the time intervals defined by the train of timing pulses, and storing the integrated phase modulated signal therein;

means responsive to said integrated phase modulated signal and to said timing pulses for detecting the amplitude of said integrated phase modulated signal at the end of each of said time intervals and producing an output signal proportional to said amplitude; and means responsive to said output signal for selectively producing a datum pulse corresponding to each occasion where the amplitude of said integrated phase modulated signal exceeds a predetermined level, the datum pulses produced by said last named means representing information contained in the applied phase modulated signal.

6. In a differentially coherent biphase demodulator for separating a train of timing signals and a series of data signals from an applied phase modulated signal, having timing and data information signals merged therein, said phase modulated signal further having random noise signals superimposed thereon, all signals merged therein or superimposed thereon contributing electrical energy to said phase modulated signal, the combination comprising:

a means continuously responsive to an applied biphase modulated signal and fractionally responsive to random noise signals superimposed on said biphase signal, for producing a train of regularly recurring timing signals; and a data detecting means receiving said timing signals and an applied biphase modulated signal on which random noise signals are superimposed, said means operable on said biphase signal for storing the energy contained within said biphase modulated signal during each time interval defined by said timing signals, the energy of said random noise signals being substantially less than that of the merged data signals, said data detecting means selectively producing a datum signal on each occasion where the energy stored therein exceeds a predetermined amount, said datum signals representing the information contained within said biphase modulated signal, said data detecting means including a discriminating circuit responsive to said stored energy for sampling quantities of stored energy and passing as said output datum signal only those quantities of energy greater than a predetermined amount.

7. The combination as defined in claim 6 wherein said data detecting means includes an integrating network responsive to said biphase modulated input signal for integrating said biphase signal over each time period defined by said timing signals to produce an integrated biphase modulated signal, said network including means for selectively producing a datum signal on each occasion where the amplitude of said integrated biphase modulated signal produced by said integrating network exceeds a predetermined level.

8. The combination as defined in claim 7 wherein said data detecting means further includes a timing signal acceptance circuit responsive to said train of regularly recurring timing signals for applying to said detecting means timing information defining said predetermined time periods during which said biphase modulated signal is integrated, said time periods corresponding to said train of regularly recurring timing signals.

9. The combination as defined in claim 8 wherein said data detecting means includes a transistor switching element having an emitter electrode, a base electrode, and a collector electrode, said emitter electrode connected to an electrical ground, said switching element intercoupling said integrating network and said timing signal acceptance circuit, said element connected by said collector electrode to said integrating network and to said timing signal acceptance circuit by said base electrode, said switching element responsive to said timing signal for controlling the times at which said quanity of electrical energy, represented by said integrated phase modulated signal, is sampled.

References Cited by the Examiner

UNITED STATES PATENTS

| | | | |
|---|---|---|---|
| 2,526,421 | 10/50 | Riggs | 328—127 |
| 3,087,156 | 4/63 | D'Onofrio et al. | 329—107 |

ROY LAKE, *Primary Examiner.*